(12) United States Patent
Tessier et al.

(10) Patent No.: US 9,052,063 B2
(45) Date of Patent: Jun. 9, 2015

(54) DEVICE FOR STORAGE OF COMPRESSED GAS, METHOD OF MAKING THE SAME, AND METHOD OF USING THE SAME

(71) Applicant: Air Liquide, Societe Anonyme pour Etude et Exploitation des Procedes Georges Claude, Paris (FR)

(72) Inventors: Pascal Tessier, Newark, DE (US); Tao Li, Garnet Valley, PA (US); Edgar S. Sanders, Jr., Newark, DE (US); David P. Edwards, Kennett Square, PA (US); Francoise Barbier, Houston, TX (US)

(73) Assignees: L'Air Liquide Société Anonyme Pour L'Étude, Paris (FR); Et L'Exploitation Des Procedes Georges Claude C.En Ltd., Zurich (CH)

( * ) Notice: Subject to any disclaimer, the term of this patent is extended or adjusted under 35 U.S.C. 154(b) by 0 days.

(21) Appl. No.: 13/731,174

(22) Filed: Dec. 31, 2012

(65) Prior Publication Data

US 2013/0186904 A1    Jul. 25, 2013

Related U.S. Application Data

(60) Provisional application No. 61/589,068, filed on Jan. 20, 2012.

(51) Int. Cl.
*F17C 1/00* (2006.01)
*B29C 39/10* (2006.01)
*B23P 11/00* (2006.01)

(52) U.S. Cl.
CPC ............ *F17C 1/00* (2013.01); *Y10T 29/49826* (2015.01); *F17C 2209/227* (2013.01);

(Continued)

(58) Field of Classification Search
CPC ............... F17C 2201/0166; F17C 2205/0142; F17C 2205/0146; F17C 2209/227; F17C 2209/234; F17C 2221/012; F17C 2223/036; B01D 63/022; B01D 63/024; B01D 63/043; B29C 39/10; Y02E 60/321
USPC ............ 156/69, 245, 256, 293; 264/139, 261, 264/263
See application file for complete search history.

(56) References Cited

U.S. PATENT DOCUMENTS

| | | | |
|---|---|---|---|
| 4,323,454 | A | 4/1982 | Fritz et al. |
| 4,432,933 | A | 2/1984 | Teitel et al. |

(Continued)

FOREIGN PATENT DOCUMENTS

| | | |
|---|---|---|
| CA | 1095639 A | 2/1981 |
| EP | 1944539 A1 | 7/2008 |

(Continued)

OTHER PUBLICATIONS

D.B. Rapp, et al.; "Journal of Non-Crystalline Solids"; 349; 2004; 254-259.

(Continued)

*Primary Examiner* — Michael Tolin
(74) *Attorney, Agent, or Firm* — Christopher J. Cronin

(57) ABSTRACT

A container for storing compressed gas includes a plurality of aligned glass capillaries extending into a tubesheet. Each of the capillaries has an open end flush with a front face of the tubesheet. An end cap having a gas outlet connectable to a compressed gas valve or conduit is fitted to the tubesheet in gas-tight fashion to form a high pressure space defined by inner surfaces of the capillaries, the front face of the tubesheet, and inner surfaces of the end cap.

7 Claims, 6 Drawing Sheets

(52) U.S. Cl.
CPC .............. *B29C 39/10* (2013.01); *B23P 11/00* (2013.01); *F17C 2201/0104* (2013.01); *F17C 2201/0123* (2013.01); *F17C 2201/0166* (2013.01); *F17C 2201/054* (2013.01); *F17C 2201/056* (2013.01); *F17C 2203/0607* (2013.01); *F17C 2203/0617* (2013.01); *F17C 2203/0619* (2013.01); *F17C 2203/066* (2013.01); *F17C 2203/0692* (2013.01); *F17C 2205/0142* (2013.01); *F17C 2205/0146* (2013.01); *F17C 2209/234* (2013.01); *F17C 2221/012* (2013.01); *F17C 2223/0123* (2013.01); *F17C 2223/036* (2013.01); *F17C 2260/011* (2013.01); *F17C 2260/036* (2013.01); *F17C 2260/042* (2013.01); *F17C 2270/0171* (2013.01); *F17C 2270/0184* (2013.01); *Y02E 60/321* (2013.01)

(56) References Cited

U.S. PATENT DOCUMENTS

| | | | | |
|---|---|---|---|---|
| 4,690,760 | A | * | 9/1987 | Smoot et al. ............ 210/321.89 |
| 6,290,756 | B1 | * | 9/2001 | Macheras et al. ................. 96/8 |
| 6,709,494 | B2 | | 3/2004 | Macheras et al. |
| 2010/0059528 | A1 | * | 3/2010 | Zhevago et al. ............. 220/592 |
| 2010/0276355 | A1 | * | 11/2010 | Kashihara ............... 210/321.89 |

FOREIGN PATENT DOCUMENTS

| | | | |
|---|---|---|---|
| EP | 2062850 | A2 | 5/2009 |
| EP | 2163805 | A2 | 7/2009 |
| EP | 2027060 | B1 | 8/2011 |
| JP | 01-148310 | * | 6/1989 |
| RU | 2345273 | C1 | 1/2009 |
| WO | 2007072470 | A1 | 6/2007 |
| WO | WO 2014/045282 | A1 * | 3/2014 |

OTHER PUBLICATIONS

J.E. Shelby; Alfred University; DOE HFCIT Annual Merit Review; Apr. 18, 2008.

D. Eliezer, et al.; "An Innovative Technology for Hydrogen Storage in Portable and Mobile Systems", 18th World Hydrogen Energy Conference; 2010.

R. Meyer; 4th ICHS—International Conference on Hydrogen Safety; 2011.

N. K. Zhevago, et al.; "Experimental Investigation of Hydrogen Storage in Capillary Arrays"; International Journal of Hydrogen Energy, vol. 35; 2010; pp. 169-175.

Glenn D. Rambach; "Hydrogen Transport and Storage in Engineered Glass Microspheres"; DOE Hydrogen Program Contractor's Review Meeting; Coral Gables, Florida; Apr. 18-21, 1995.

PCT/US2013/022182; International Search Report; May 6, 2013.

* cited by examiner

DEVICE FOR STORAGE OF COMPRESSED GAS, METHOD OF MAKING THE SAME, AND METHOD OF USING THE SAME

CROSS-REFERENCE TO RELATED APPLICATIONS

This application claims the benefit of U.S. Provisional Application No. 61/589,068 filed Jan. 21, 2012, the disclosure of which is incorporated herein by reference.

BACKGROUND

1. Field of the Invention

The present invention relates to devices for storage of compressed gases and methods for making or using the same. More particularly, it relates to devices for storage of compressed gases, such as hydrogen, in glass capillaries and methods for making or using the same.

2. Related Art

Hydrogen storage is a key challenge for the development of hydrogen energy applications. Two main objectives motivate improvement over steel cylinders. First, the cost of $H_2$ transport must be reduced. For example, the overall capital and operating cost of tube trailers accounts for a major part of the price of delivered hydrogen. Second, the functional requirements of hydrogen energy systems must be met, such as the gravimetric and volumetric density sufficient to allow $H_2$ fuel cell vehicles to match equivalent gasoline vehicles.

The use of steel cylinders has been the most widely used compressed $H_2$ gas storage technology for many years. It provides gravimetric and volumetric storage density of 1 wt % and 16 g/L, respectively. Alternatives to steel cylinders include liquid $H_2$ tanks, composite compressed $H_2$ gas tanks, adsorbents, metal hydrides, and chemical hydrides.

Liquid $H_2$ tanks are typically used for large hydrogen delivery rates and large distances that justify the high capital cost and energy requirements of $H_2$ liquefiers. While they are an established technology, they do not scale down well. For small tanks, the higher surface/volume ratio makes boil-off a major issue.

Composite compressed $H_2$ gas tanks are typically made of an aluminum or polymer liner with a polymer/carbon fiber overwrapping. They are designated type III and type IV. They provide gravimetric and volumetric storage densities of 5 wt % and 26 g/L, respectively. Composite cylinders made with carbon fibers are significantly more expensive than steel cylinders mostly due to the relatively high cost of carbon fibers. High volume production of carbon fibers is not likely to reduce their high cost because of their prevalent use in aerospace composites.

Chemical hydrides are metal-hydrogen compounds that generate hydrogen at the point of use through an irreversible reaction. The spent reaction product(s) needs to be recycled at a central facility. They can provide very high gravimetric capacity (>10% for sodium borohydride). However, chemical hydrides are relatively expensive. Moreover, the operability of $H_2$ generators and the logistics of recycling reaction product(s) are major drawbacks.

Adsorbents operate by physisorption, with $H_2$ molecules being weakly bound to the surface of micro-pores. Appreciable storage capacity is obtained only at low temperature, near 77K. In an adsorbent-based tank, $H_2$ is stored both as adsorbate and in the gas phase. Volume occupied by the adsorbent's skeleton is not accessible to the gas phase. Above a certain pressure this exclusion by the adsorbent's skeleton becomes too penalizing and it is more efficient to remove the adsorbent.

For several years activated carbon was the best adsorbent for cryosorption. However, its performance has not led to commercialization and the use of a combustible adsorbent (such as activated carbon) at low temperature involves risks linked to the potential accumulation of contaminant oxygen.

In the last few years, higher storage capacity was demonstrated in metal-organic frameworks (MOFs). MOFs consist of periodic arrays of metal centers bound by organic linkers. They have very high porosity and well-defined pore sizes. A major drawback of MOFs is the energy and equipment required to extract heat of desorption generated during filling as well as the relatively low delivery pressure at the point of use. This may be contrasted with liquid $H_2$ which can be pumped to high pressure using low power, vaporized using ambient heat, and injected into a high-pressure tank, therefore paying back for the energy spent in liquefaction.

Metal hydrides are formed by dissociation of molecular hydrogen and dissolution of hydrogen atoms in metals. $H_2$ atoms occupy interstitial sites in the crystal structure of metals, intermetallic compounds, alloys, or metallic composites. Hydride formation is accompanied by the release of heat of absorption (typically 30 to 70 kJ/mol), expansion of the crystal structure (by as much as 30%), and decrepitation/settling effects upon cycling. Thus, thermal effects are very important. Significant amounts of heat must be extracted during filling, and injected for discharge. In storage systems, mechanical effects (decrepitation/settling and expansion) must be managed for example by using a polymer/metal hydride composite.

On the positive side, metal hydrides provide low pressure storage, nearly constant discharge pressure at constant temperature (because of the plateau in the pressure-concentration isotherm), and result in purification of the delivered hydrogen since other gases do not dissolve in the metal hydride as easily as hydrogen. Metal hydrides have a good gravimetric capacity (1-10 wt %) and a very high volumetric density (in some hydrides higher than even that of liquid $H_2$).

On the other hand, high-energy ball mills used to produce high-performance hydrides are expensive and result in a high capital cost per kg of hydrogen stored. Milling very fine and reactive metallic powder subjects the production process to significant risks of violent reaction from exposure to air or water. There is no large scale commercialization of metal hydride tanks.

In conclusion, several barriers remain to the commercial introduction of metal hydrides. For industrial gas operations, they simply remain too expensive.

Glass microspheres have been proposed for a number of years as miniature hydrogen storage vessels. R. Teitel: "Hydrogen Storage in Glass Microspheres", Rept. BNL 51439, Brookhaven National Laboratories, 1981. Glass microspheres are appealing due to the fact that the failure of one microsphere is expected to have no consequence in terms of safety since the amount of hydrogen released is minimal. Filling and release is accomplished by heating the microspheres from ambient temperature, at which the permeability of hydrogen in the microspheres is minimal, to a temperature in the range 100-400° C., at which the permeability of hydrogen in the microspheres allows them to be filled or released based upon the pressure difference across the microsphere wall. Thus, a heating source is required. A different scheme was recently proposed using the IR sensitivity of doped glass to induce hydrogen release. D. B. Rapp, J. E. Shelby, Journal of Non-Crystalline Solids 349 (2004) 254-259. Nevertheless, the demonstrated capacity of glass microsphere-based systems has so far been considered non-competitive to alternative hydrogen storage techniques. For example, one project demonstrated gravimetric and volumetric capacities of 2.2 wt % and 4 g/L, respectively. J. E. Shelby, Alfred University, DOE HFCIT Annual Merit Review, Apr. 18, 2008. 2.2 wt % is better than Type I cylinders but much lower than Type III and IV cylinders.

RU 2345273 proposed the use of glass capillaries as storage devices. These devices are sealed by a hydrogen permeable material or a low melting point alloy and include a heater for releasing hydrogen. One particular experimental result demonstrates gravimetric capacity of 7.1 to 12 wt % and a fill time of 10 to 30 minutes.

C. En is pursuing the development of a storage system with a gravimetric capacity of 33 wt % and a volumetric density of 45 g/L (*An Innovative Technology for Hydrogen Storage in Portable and Mobile Systems*, D. Eliezer, Kai Holtappels, Martin Beckmann-Kluge, 18th World Hydrogen Energy Conference 2010). These values are for maximum pressure and do not include any safety margin. The storage system consists of a bundle of glass capillaries (hollow fibers) able to store hydrogen at very high-pressure. The required hollow glass fiber wall thickness for a given pressure is calculated using the known relation:

$$h = r \cdot P_{max}/\sigma,$$

where h is the wall thickness, r the radius, $P_{max}$ is the maximum operating pressure times the safety factor, and a the tensile strength of the glass used. When a safety factor of 2 is considered, the foregoing maximum capacity falls to 23 wt % and 44 g/L for extremely thin-wall glass capillaries. To assemble a large number of glass capillaries and store a significant volume of $H_2$, capillaries can be assembled into a fused array as in R. Meyer, 4th ICHS—International Conference on Hydrogen Safety 2011. This method involves high-temperature processing and is inherently expensive.

While the foregoing solutions offer a variety of desirable features, it would be desirable to provide a solution for storage of compressed gases, such as hydrogen, in devices that allow high gravimetric and volumetric densities, are scalable, are not susceptible to boil-off losses, are economical to make and use, do not produce waste products through normal usage, are not susceptible to contamination with oxygen, whose filling and release are not energy-intensive, do not exhibit an undesired degree of decrepitation/settling and expansion, do not incur a significant risk of violent reaction from exposure to air or water during production, which may be filled and released at temperatures less than 100° C., which are easy to fill and release, perform in a robust manner, and may be constructed in a wide variety of simple designs.

SUMMARY

There is disclosed a first compressed gas storage container comprising: a first solid, polymeric tubesheet having a front face; a plurality of aligned glass capillaries extending into the first tubesheet, each of the glass capillaries having an open end that is flush with the front face of the first tubesheet; and a first end cap sealed to the first tubesheet in gas-tight fashion, the first end cap including a gas outlet.

There is also disclosed a method of manufacturing the above-disclosed first container that comprises the following steps. A plurality of glass capillaries are aligned into a bundle of desired cross-sectional shape, the capillaries being open at a first end of the bundle. The open capillary ends are plugged. The sealant in the plugged capillary ends is cured. The first end of the bundle is dipped in a curable, liquid resinous composition. The dipped bundle end is removed from the composition. The composition on the dipped bundle end is allowed to cure and form a first unfinished tubesheet. A portion of the cured, dipped bundle end is machined or milled to form the front face of the first tubesheet, remove the cured sealant and expose open bores of the capillaries. Ends of the capillaries distal to the dipped bundle are sealed. The first end cap is secured to the first tubesheet.

There is disclosed a second compressed gas storage container comprising: a first solid, polymeric tubesheet having a front face; a second solid, polymeric tubesheet having a front face that is spaced from the first tubesheet; a plurality of aligned glass capillaries extending into the first tubesheet, each of the glass capillaries having an open end that is flush with the front face of the first tubesheet; and a first end cap sealed to the first tubesheet in gas-tight fashion, the first end cap including a gas outlet, wherein each of the glass capillaries also has a closed end that is flush with the front face of the second tubesheet.

There is also disclosed a method of manufacturing the above-disclosed second container that comprises the following steps. A plurality of glass capillaries are aligned into a bundle of desired cross-sectional shape, the capillaries being open at first and second ends of the bundle. The first open capillary ends are plugged. The sealant in the plugged capillary ends is cured. The first end of the bundle is dipped in a curable, liquid resinous composition. The dipped, first bundle end is removed from the composition. The composition on the dipped, first bundle end is allowed to cure to form a first unfinished tubesheet. The second end of the bundle is dipped in a curable, liquid resinous composition. The dipped, second bundle end is removed from the composition. The composition on the dipped, second bundle end is allowed to cure to form a second unfinished tubesheet. A portion of the cured, dipped first bundle end is machined or milled to form the front of the first tubesheet, remove the sealant, and expose open bores of the capillaries at the first bundle end. A portion of the cured, dipped second bundle end is machined or milled to form the front face of the second tubesheet without exposing open bores of the capillaries at the second bundle end. The first and second end caps are secured to the first and second tubesheets, respectively.

There is also disclosed a compressed gas storage assembly comprising a plurality of the above-disclosed first or second containers and a compressed gas manifold connecting the associated plurality of first end caps, wherein the manifold includes a main gas outlet.

There is also disclosed a method of using the above-disclosed first container, second container, or assembly that comprises the following steps. A high pressure volume defined by inner surfaces of the glass capillaries, the front face of the first tubesheet, and an inner surface of the end cap is filled with a gas to a desired pressure.

Any one or more of the first container, the second container, the assembly, the method of manufacturing the first container, the method of manufacturing the second container, the method of using the first container, the method of using the second container, and the method of using the assembly may include one or more of the following aspects:

- each of the glass capillaries also has a closed, gas-tight end distal to the first tubesheet
- a protective housing is secured to the first and second tubesheets that surrounds at least portions of the capillaries that are adjacent the closed capillary ends, wherein: a high pressure volume is defined by inner surfaces of the glass capillaries, the front faces of the tubesheets, and an inner surface of the end caps; and the protective housing does not form part of the high pressure volume.

a protective housing is secured to the first tubesheet that surrounds at least portions of the capillaries that are adjacent the closed capillary ends, wherein: a high pressure volume is defined by inner surfaces of the glass capillaries, the front face of the first tubesheet, and an inner surface of the first end cap; and the protective housing does not form part of the high pressure volume.

the first tubesheet extends along an entire length of the capillaries.

a ratio of a thickness of the first tubesheet to a diameter or hydraulic diameter of the tubesheet is at least 1:1.

a ratio of the thickness of the first tubesheet to the diameter or hydraulic diameter of the first tubesheet is at least 2:1.

the first tubesheet does not extend along an entire length of the capillaries.

the first end cap is sealed to the first tubesheet with an epoxy sealant.

the first end cap is threadingly sealed to an outer, circumferential surface of the first tubesheet.

the solid, polymeric material is made from a cured, liquid resinous composition.

the solid, polymeric material is an epoxy.

the glass capillaries are made of an magnesio-alumino silicate glass.

the glass capillaries are present in the first tubesheet at a packing density of 40% to 70% vol/vol.

a high pressure volume is defined by inner surfaces of the glass capillaries, the front face of the first tubesheet, and an inner surface of the first end cap; and the container can handle a pressure in the high pressure volume of 140 MPa without bursting.

an outside diameter of the capillaries is in the range of from 0.1 mm to 1 mm and an inside diameter of to capillaries is in the range of from 0.05 mm to 0.99 mm.

the capillaries have a length of 100-1,000 mm.

the gas outlet is threaded to receive a complementarily threaded end of a compressed gas valve or pressure regulator.

the bundle has a cross-sectional shape that is selected from the group consisting of: circular, hexagonal, trapezoidal, rectangular, triangular, oval, and planar.

said step of sealing the ends of the capillaries distal to the dipped bundle is performed: either before or after said step of aligning; or before or after the first tubesheet is formed.

said step of sealing the ends of the capillaries distal to the dipped bundle is performed after the capillaries are aligned but before the first tubesheet is formed.

said step of sealing the ends of the capillaries distal to the dipped bundle comprises application of heat to melt and close off the end to be sealed.

said step of sealing the ends of the capillaries distal to the dipped bundle comprises plugging the ends to be sealed with a high strength material, heating the ends plugged with the high strength material under conditions sufficient to melt the high strength material and form a gas-tight seal, and cooling to solidify the molten plugs.

the gas is hydrogen.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
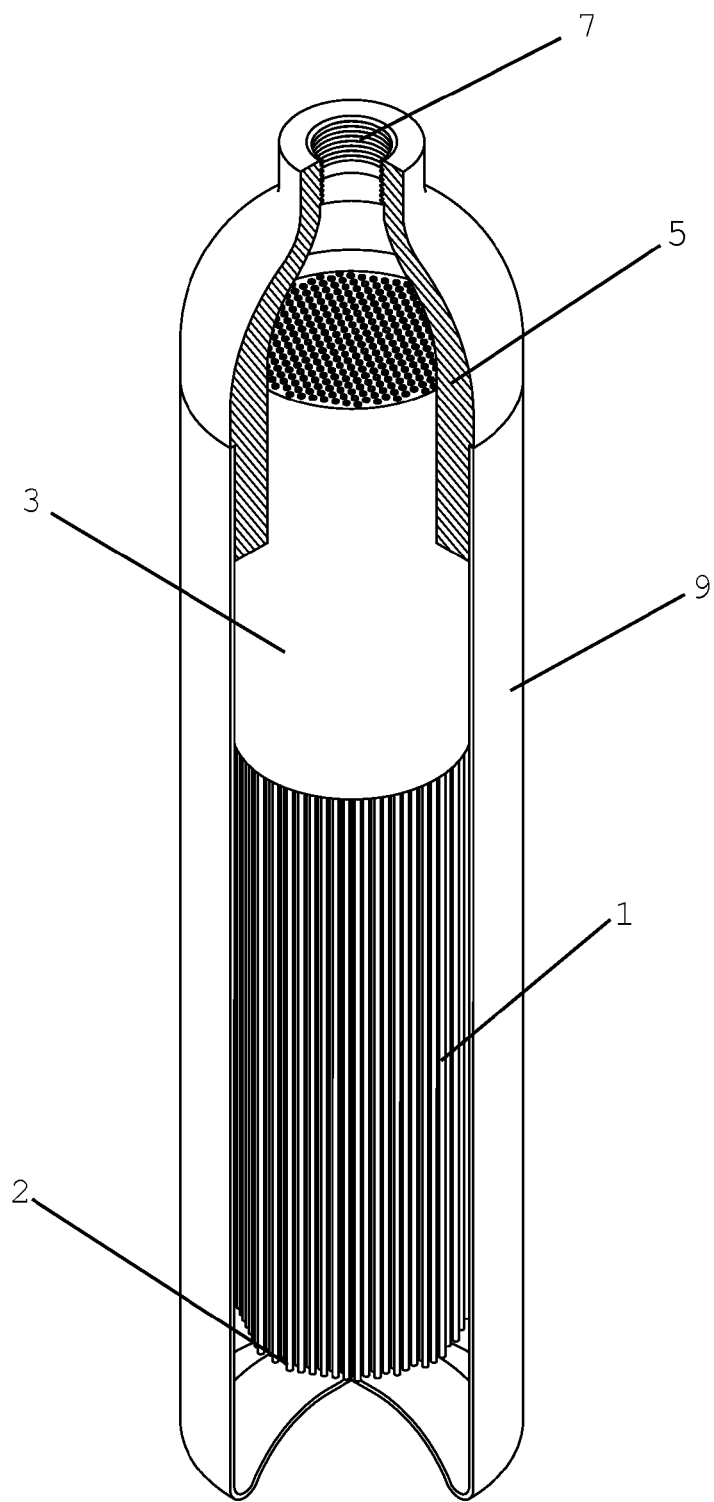
FIG. 1 is an isometric view of the compressed gas container of the invention with parts removed to reveal interior details.

The compressed gas container of the present invention utilizes a plurality of glass capillaries for high pressure storage of a gas. The capillaries are closed on one end and open on the opposite end. The portions of the capillaries adjacent the open ends extend into a solid, polymeric tubesheet (a first tubesheet). Optionally, the portions of the capillaries adjacent the closed ends extend into a separate solid, polymeric tubesheet (a second tubesheet). A front face of the tubesheet is flush with the open ends of the capillaries. A concave end cap is connected to the tubesheet. A gas outlet is formed in an end of the end cap to allow gas to flow from inside the capillaries, through a space defined by the front face of the tubesheet and inner surfaces of the end cap, and out the outlet. The gas outlet is connectable with a conventional compressed gas valve or tube or other typical equipment known in the field of compressed gases that is compatible with the gas of interest. The tubesheet may extend along a portion of the length of the capillaries or along the entire length of the capillaries. The portions of the capillaries adjacent the closed ends may optionally be surrounded with a protective housing that is connected to the tubesheet.

A gas outlet is formed in an end of the end cap to allow gas to flow inside the capillaries for storage as well.

The capillaries may be made of any type of high-tensile strength glass known in the art such as magnesio-alumino silicate glass (known as S-2). For a given storage pressure and allowing for a safety factor of two, glasses having a higher tensile strength will allow the thickness of the tubesheet to be made smaller while glasses having a lower tensile strength will require the thickness of the tubesheet to be made larger. For example, while larger or smaller diameter capillaries may be used, typically the outside diameter of the capillaries is in the range of from 0.1 mm to 1 mm while a typical inside diameter is in the range of from 0.05 mm to 0.99 mm. The length of the capillaries may similarly be varied with the ultimate length being driven by the size and shape of the desired container and the volume of gas desired to be stored in the container. Typically, the capillaries have a length of 100-1,000 mm.

While the number of capillaries may similarly vary from as few as two to as many as thousands, typically the number of capillaries is driven by the size and shape of the container and the volume of gas desired to be stored in the container. The capillaries are aligned in parallel to one another. While the portions of the capillaries outside the tubesheet may be uncoated, optionally they may have a coating of the same material as used in the tubesheet in order to provide a degree of shock absorption. Optionally, the coating may comprise a material different from that of the tubesheet, such as an anti-scratch coating, but such material (such as a polyamide, polyimide, polysulfone, etc.) should be chemically compatible with the material of the tubesheet. Typically, the coated or uncoated capillaries are bundled together to that their outer surfaces may touch one another. It should be noted that the material of the tubesheet fills the spaces in between the capillaries in order to form a gas tight seal in between the glass capillaries.

The tubesheet may be formed from a curable, liquid resinous composition that is subsequently cured during the gas container manufacturing process. Typical resins (and optionally curing agents) for the composition and typical curing treatments that may be used in the invention are disclosed by U.S. Pat. No. 4,323,454 and U.S. Pat. No. 6,709,494, the contents of which are incorporated by reference.

The ultimate cross-sectional shape of the tubesheet is driven by the desired gas container shape and/or the desired shape of the end cap. Thus, if the gas container has a circular cross-sectional shape or the portion of the end cap to be connected to the tubesheet has a circular cross-sectional shape, the tubesheet is typically formed with that corresponding circular cross-sectional shape. If the bundle of capillaries has a cross-sectional shape different from that of the end cap, the peripheral portion of the tubesheet surrounding the bundled capillaries may be molded or machined in order to form the desired cross-sectional shape to complement the cross-sectional shape of the end cap so that the end cap and tubesheet are fitted together with a gas-tight seal. While the thickness of the tubesheet in the axial direction of the capillaries may also vary, the minimum thickness is driven by the mechanical properties of the material from which the tubesheet is formed, and the mechanical properties of the glass capillaries, the mechanical properties of the composite material that combines the tubesheet materials and the glass capillaries, as well as by the dimension or diameter of the tubesheet and the desired gas storage pressure.

A peripheral portion of the tubesheet surrounding the capillaries is connected to an open end of the end cap to form a gas-tight seal between the tubesheet and the end cap. This gas-tight relationship may be achieved by any means known in the art. Typically, a sealant such as an epoxy is used to adhere the open end of the end cap to the face of the tubesheet or the inner surface of the open end of the end cap to the circumferential surface of the tubesheet surrounding the capillaries. Alternately, the gas-tight seal may be achieved by providing complementary threading on the circumferential surface of the tubesheet and an inner surface of the end cap and an O-ring or gasket positioned between the circumferential surface of the tubesheet and the inner surface of the end cap. In this way the end cap may be threaded onto the tubesheet. The tubesheet materials itself may adhere to the end cap and provide a gas-tight seal.

The gas outlet of the end cap may have one of a wide variety of configurations. For example, the gas outlet may be a tube with an upstream end that is adapted and configured for gas-tight engagement with a compressed gas valve or other typical equipment known the field of compressed gases. As another example, the gas outlet may simply be an opening adapted and configured for gas-tight engagement with a compressed gas tube or valve or other typical equipment known in the field of compressed gases. Typically, the gas outlet is threaded to receive a complementarily threaded end of a compressed gas valve. In this manner, the valve may be manipulated to allow or prevent a flow of varying rates out of the gas storage container.

A gas-tight seal is also formed in between the solid tubesheet and outer surfaces of the capillaries. Thus, assuming the gas outlet is fitted with a valve or other equipment fitted with a valve to prevent escape of the gas from the container, a gas may be stored at superambient pressures in the bores of the capillaries and in the space defined by inner surfaces of the end cap and by the front face of the tubesheet. While the capillaries, tubesheet and end cap may be constructed of relatively lower strength materials that allow the container to contain a gas at relatively low pressures, in order to better take advantage of the potential gravimetric and volumetric gas storage densities of the invention, they are typically constructed of high strength materials allowing the gas to be stored at pressures of up to 140 MPa without rupturing. By making the length of the bundle of capillaries arbitrarily long, the gravimetric density of hydrogen may be maximized by minimizing the relative weight of the high-pressure cap. The gravimetric density of hydrogen may also be maximized by minimizing the length of the tubesheet. In order to withstand typical shear stresses at the interface between the tubesheet and the end cap experienced when high pressure gas is stored in the capillaries, the tubesheet length should not be decreased arbitrarily. For example, for a filling pressure of 700 bar (70 MPa), the tubesheet thickness to diameter ratio (for tubesheets having a circular cross-section) should be at least 1:1, more typically at least 2:1 in order to insure that the tubesheet does not mechanically fail at that interface. For tubesheets having a non-circular cross-section, for a filling pressure of 700 bar (70 MPa), a ratio of the tubesheet thickness to the hydraulic diameter of the tubesheet should be at least 1:1, more typically at least 2:1 in order to insure that the tubesheet does not mechanically fail at that interface. The hydraulic diameter of the tubesheet is defined as the ratio of 4 times the area of the cross section of the tubesheet divided by the perimeter of the cross section of the tubesheet.

In order to protect portions of the capillaries that may extend outside of the tubesheet adjacent the closed capillary ends, the bundle may also include a protective housing attached to the tubesheet. The protective housing extends beyond and surrounds the closed ends of the capillaries. Optionally, the protective housing may also cover the end cap and the tubesheet. In either case, a shock-absorbing material may be placed in between the protective housing and the capillaries. The protective housing does not form part of the high pressure environment enclosing the gas to be stored. Rather, the high pressure space is defined by inner surfaces of the capillaries, the front face of the tubesheet and inner surfaces of the end cap. Therefore, the protective housing does not need to be made of a high strength (hence heavy) material able to withstand high pressures. Typically, it is made of metal, plastic, or a composite material. The protective housing is optionally equipped with a pressure relief valve having a lower setpoint pressure than the design pressure of the gas container so that the space enclosed in between outer surfaces of the capillaries and the inner surface of the protective housing will never get over-pressurized.

Because only the end cap and tubesheet need be made of a material able to withstand high pressures and because the capillaries are made of a relatively low density (in comparison to stainless steel), high strength material (glass), a gas may be stored in the container at gravimetric densities much higher than those achieved in conventional compressed gas containers and at volumetric densities much higher than those achieved in many conventional compressed gas containers. The gravimetric density may be maximized by maximizing the packing of the capillaries in the assembly, minimizing the length of the end cap (assuming that a minimum thickness of the end cap is necessary for withstanding the design pressure), and/or maximizing the length of the capillaries. The volumetric density of gas to be stored in the finished container may be maximized by maximizing the packing of the capillaries in the assembly, minimizing the length of the end cap, minimizing the volume of the protective housing, and/or maximizing the length of the capillaries. While the gravimetric and/or volumetric density achievable by the invention may range from about 4% to about 22%, typically the gravimetric and/or volumetric density ranges from about 4% to about 10%.

A non-limiting list of gases that may be stored in the inventive container includes hydrogen, oxygen, nitrogen, carbon dioxide, helium, argon, krypton, neon, and nitrous oxide. Because many commercial hydrogen energy applications require relatively high pressures, the invention is most particularly applicable to storage of hydrogen at high pressures. While pressures beyond 50 bar are rarely needed, relatively high pressures are utilized in order to maximize the gravimetric and volumetric densities.

The container may be manufactured as follows.

A plurality of glass capillaries of similar length are gathered and aligned into a bundle of desired cross-sectional shape. Non-limiting examples of cross-sectional shapes include: circular, hexagonal, trapezoidal, rectangular, triangular, oval, or even flat shapes.

The tubesheet may be formed by any method known in the art of gas separation membrane manufacturing. In one typical method, the tubesheet is formed by dunk-potting. Dunk-potting is achieved by dipping an end of the bundle adjacent the open capillary ends in a curable, liquid resinous composition, and allowing the composition to cure. In another typical method, the tubesheet is formed by brushing the surfaces of the capillaries with the curable, liquid resinous composition followed by curing of the resin. Alternatively, the liquid resinous composition may be injected into the bundle end and subsequently cured in a mold. To prevent the composition from wicking into the bores of the capillaries, the open capillary ends should be plugged with a sealant such as an epoxy which is cured before dunk-potting or injection. These sealant plugs are later removed via machining or milling of the front face of the tubesheet. The machining or milling also exposes the open bores of the capillaries. In the case of the optional second tubesheet, the machining or milling of the second tubesheet does not expose the open bores of the capillaries.

The ends of the capillaries opposite the tubesheet may be sealed either before or after the capillaries are gathered and aligned and before the tubesheet is formed. For ease in manufacturing, they are typically sealed after the capillaries are gathered and aligned but before the tubesheet is formed. They may be sealed with application of high temperatures to melt and close off the end. Alternatively, they may be sealed by plugging them with a high strength material, heating the plugged ends to melt the high strength material to form a gas-tight seal, and cooling the plugged ends to solidify the plugs.

Once the tubesheet has been completely cured or at least stabilized, the capillary encapsulated tubesheet is milled or machined, thereby forming a cross-sectional planar tubesheet front face and exposing the open bores of the capillaries at the first tubesheet. Again, in the case of the optional second tubesheet, milling or machining does not expose the open bores of the capillaries. The bundle is then finished by capping the tubesheet with a high-pressure end cap made of a high strength material able to withstand relatively high pressures of 140 MPa or more. Typically, the end cap is made of gas-compatible steel or alloy. The end cap may be secured to the tubesheet itself with an adhesive or both the tubesheet and end cap may be complementarily threaded and the end cap threaded onto the tubesheet.

FIG. 1 illustrates the inventive container with the optional protective housing where portions of the end cap, tubesheet, and protective housing are removed to reveal interior details. The inventive container includes a plurality of aligned glass capillaries 1 each one of which has a closed end 2. The capillaries 1 extend into a tubesheet 3. An end cap 5 is secured to the tubesheet 3 to form a gas-tight seal in between the tubesheet 3 and end cap 5. The end cap 5 includes threading 7 connectable to a conventional threaded compressed gas valve or conduit. The optional protective housing 9 surrounding the capillaries 1 at least over the portions adjacent the closed ends 2 is secured to the tubesheet 3.

Figure 2:
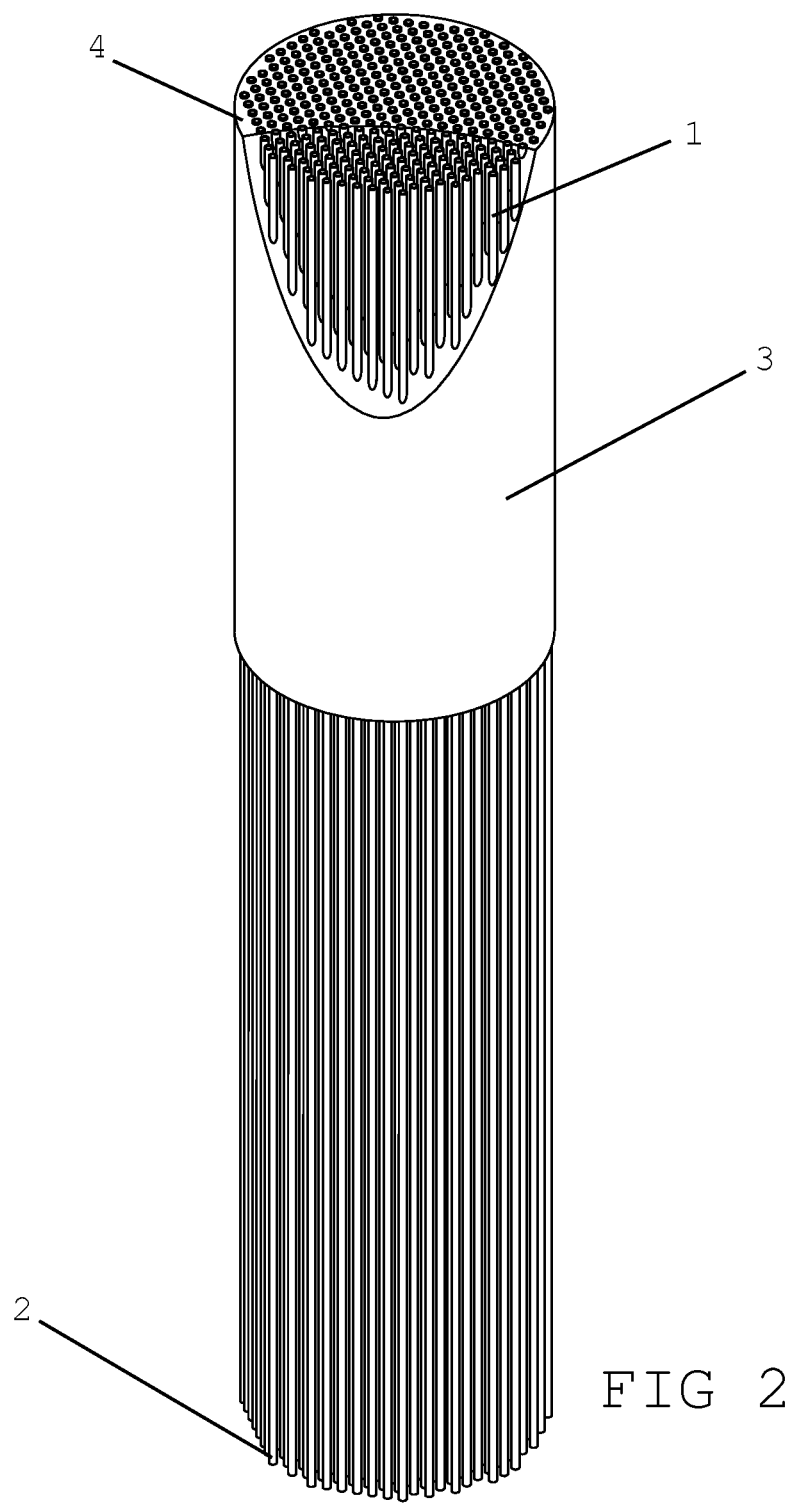
FIG. 2 is an isometric view of the container of FIG. 1 with the cap, the protective housing, and a portion of the tubesheet removed to reveal interior details.

It should be kept in mind that the FIGURES are not necessarily drawn to scale. For example, the spacing in between the capillaries may vary. Relatively larger or smaller spacing in between capillaries 1 taken up by the cured resin of the tubesheet 3 will result in a relatively lower or higher degree of packing, respectively. While the packing density of the capillaries in the tubesheet may range from about 40% to about 90%, typically, the packing density ranges from about 40% to about 70%. The packing density is ideally as high as possible while still allowing the tubesheet material to cover the outside surfaces of all the capillaries as much as possible. FIG. 2 illustrates the inventive container while omitting the end cap 5 and optional protective housing 9. As seen in FIG. 2, the open ends of the capillaries 1 are flush with a front face 4 of the tubesheet 3. Also, an outside diameter of the capillaries 1 does not vary from the closed end 2 to the open end flush with front face 4.

Figure 3:
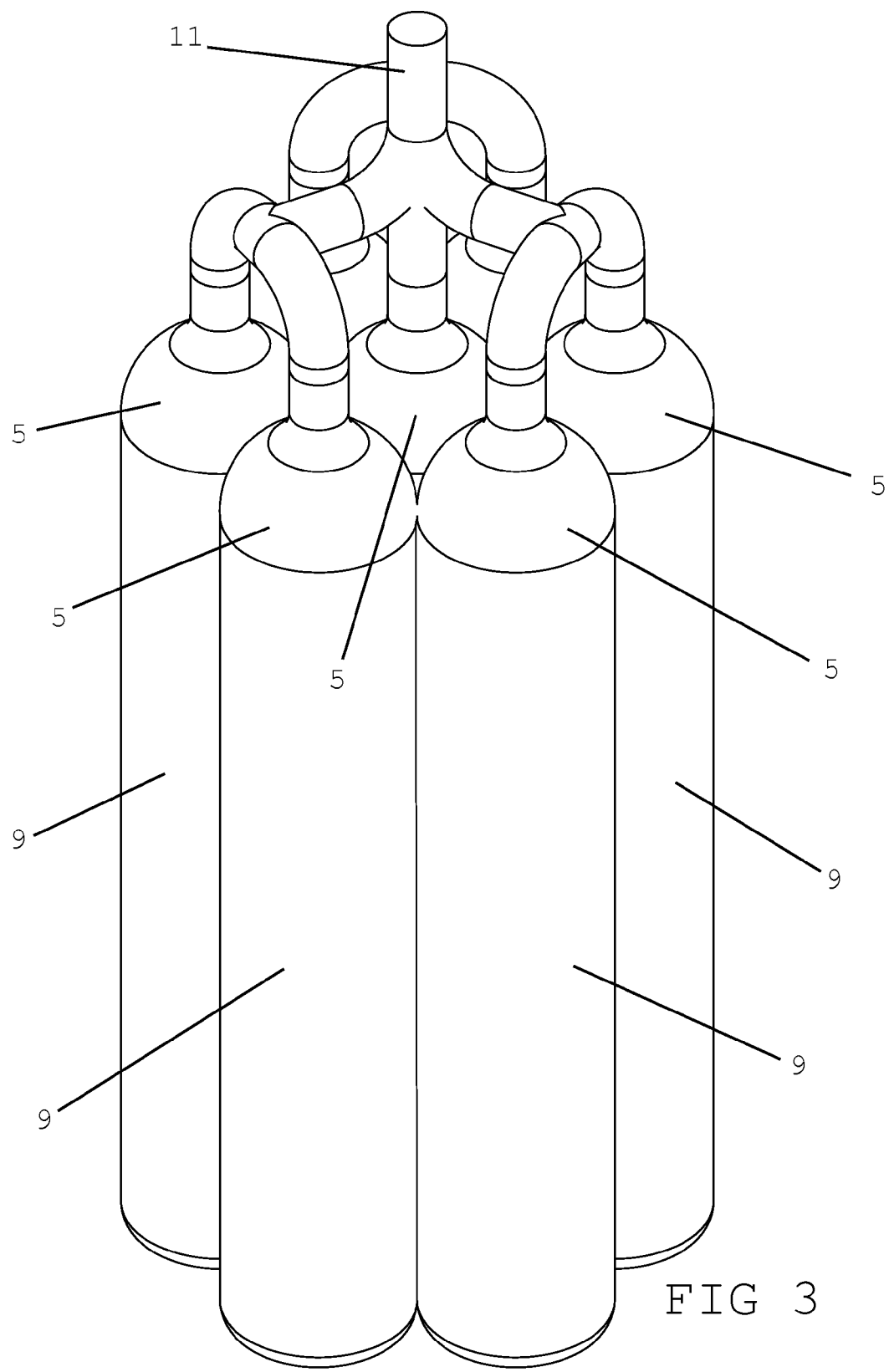
FIG. 3 is an isometric view of a hexagonally arranged plurality of the containers of FIG. 1 connected with a manifold.

As seen in FIG. 3, a plurality (in this case 7) of the inventive containers can be connected with a manifold 11 (in a hexagonal arrangement). In this manner, a single container design can be easily scaled up to provide a greater degree of gas storage capacity. Although FIG. 3 illustrates six containers, any number of containers may be connected with a manifold in any configuration. Additionally, any number of containers having two tubesheets as described above may be connected with a manifold in any configuration.

Figure 4:
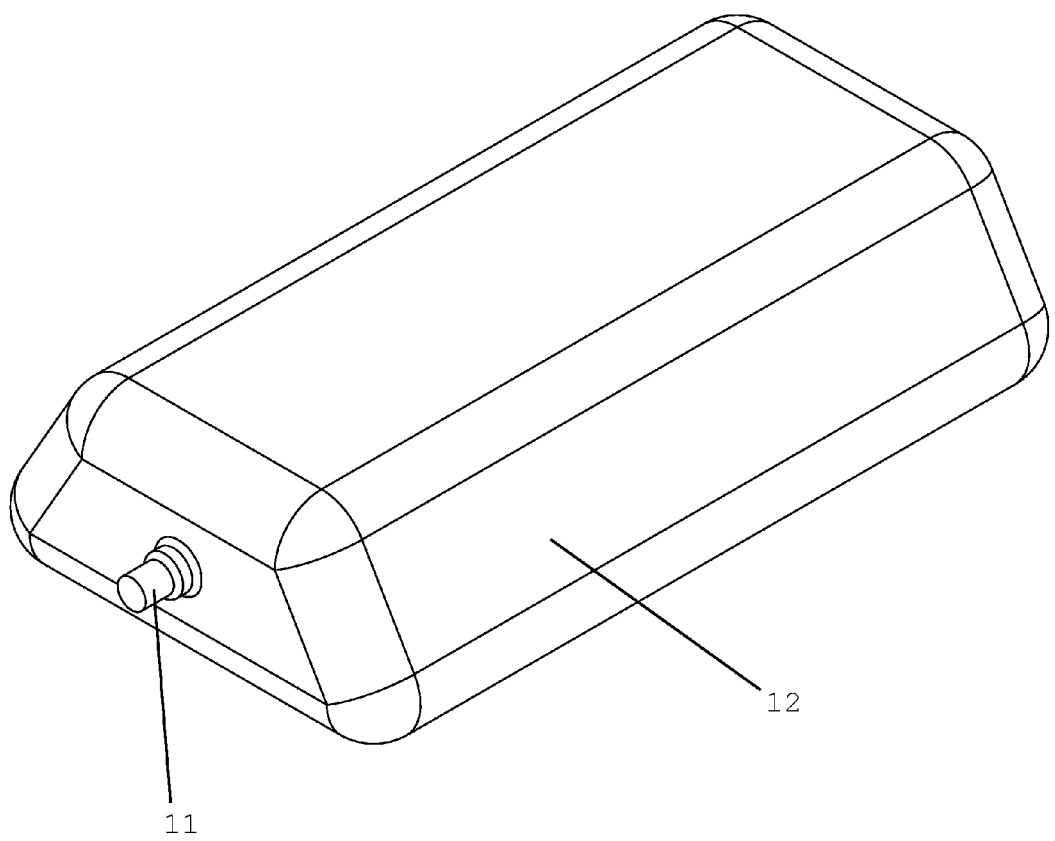
FIG. 4 is an isometric view of the cylinders of FIG. 5 including a protective shroud.
Figure 5:
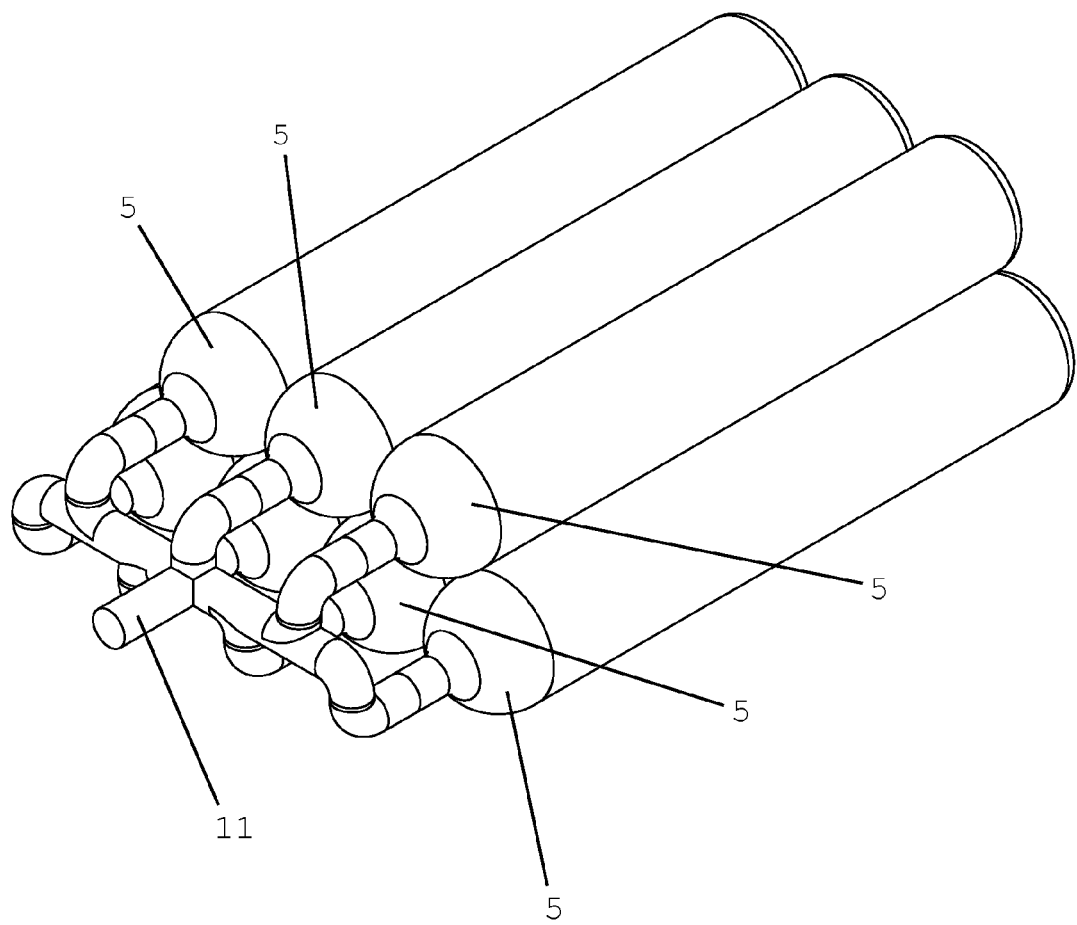
FIG. 5 is an isometric view of a plurality of the containers of FIG. 1 connected with a manifold.

FIG. 5 illustrates the concept of connecting a plurality (in this case 7) of the inventive containers in a somewhat flat shape by connecting them with a gas manifold 11. FIG. 4 shows a protective shroud 12 surrounding the plurality of containers and from which an inlet of the manifold 11 extends.

Figure 6:
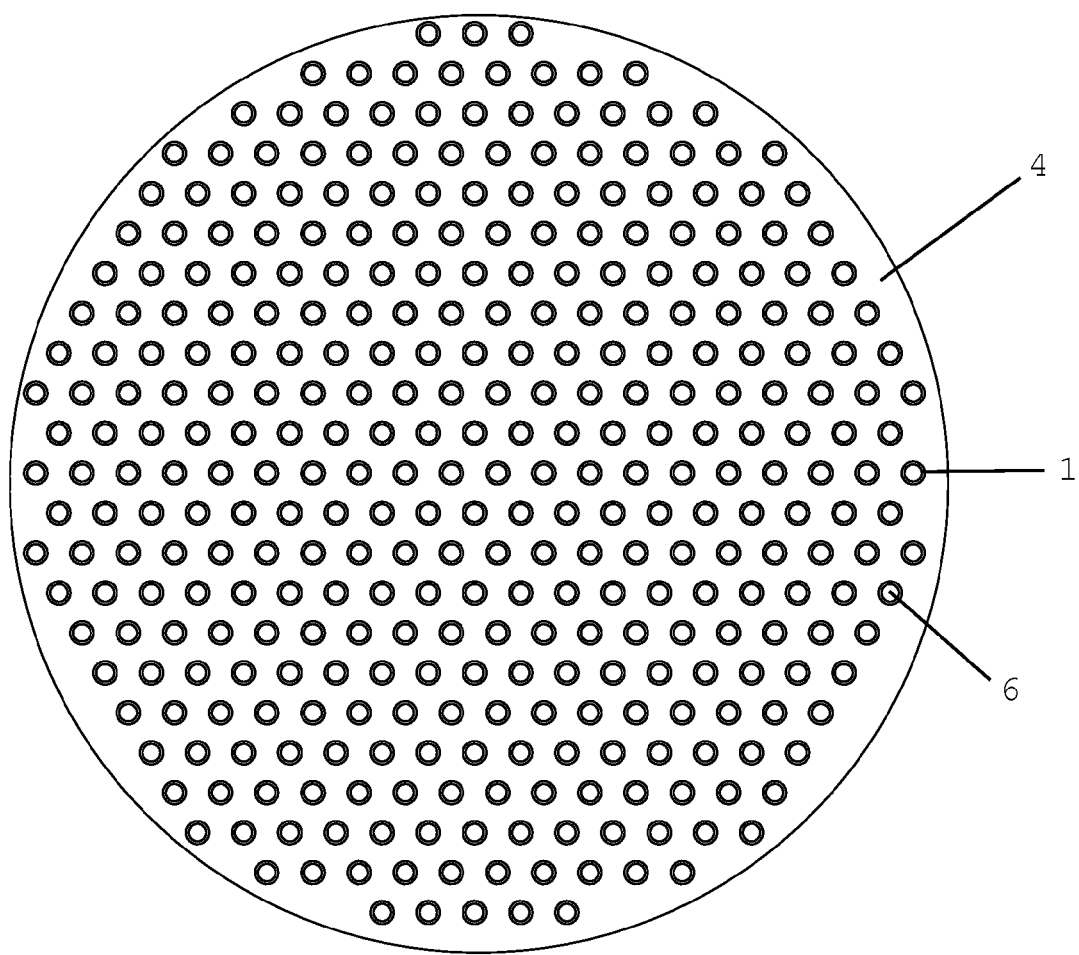
FIG. 6 is a front elevation view of the container of FIG. 1 without the cap or the protective housing.

FIG. 6 shows the inventive container while omitting the end cap 5 and the optional protective housing 9. Because the cured tubesheet 3 has been milled or machined to expose the open ends of the capillaries, the bores 6 of the capillaries 1 are visible.

The inventive container may be operated as follows. A conventional compressed gas valve or conduit (which is itself connected with a valve) that is compatible with the gas of interest is secured to the gas outlet 7 of the end cap 5. The valve in question is connected to a source of the gas of interest. The valve is opened to allow the gas of interest to flow into the container via the outlet 7, the space defined by inner surfaces of the end cap 5 and the tubesheet face 4, and into the bores 6 of the capillaries 1. When a desired fill pressure is reached, the valve is closed and the gas source disconnected from the valve. The gas may be dispensed from the container by connecting the valve to a receiving device (such as a hydrogen powered fuel cell), opening the valve, and allowing a desired amount of gas to exit the container. During the filling and dispensing, no heat is added or removed from the container other than removal of the heat resulting from compression of the hydrogen within the capillaries.

PROPHETIC EXAMPLES

A storage device includes glass capillaries made of S-2 type glass having an inner diameter of 360 μm and an outer diameter of 370 μm. S-2 type glass has an inherent tensile strength of 709,050 psi and an inherent compressive strength of 232,000 psi. The apparent tensile strength and apparent compressive strength of the capillaries were calculated by multiplying the inherent tensile and compressive strengths by the ratio of the cross sectional area of the fiber wall to the cross sectional area based outer diameter. This yielded an apparent tensile strength of 37,809 psi and an apparent compressive strength of 12,371 psi for each capillary.

Novolac epoxy has a tensile strength of 5,300 psi and compressive strength of 18,000 psi. Tensile strength and compressive strength of tubesheet at a capillary packing density of 50%, were calculated with the rule of mixture to be 21,555 psi and 15,186 psi, respectively. Before curing the material of the tubesheet, an outer layer or wrap made of the same material as the potting epoxy may be placed around the tubesheet to form part of the finished tubesheet. The transverse shear strength of uniaxial glass fiber reinforced composite at 50 vol % of glass fiber is 6,000 psi, the transverse tensile stress is 4,000 psi and transverse compressive strength is 20,000 psi (L. E. Nielson, Mechanical Properties of Polymers and Composites, Marcel Dekker, Inc., New York (1974)).

The stress in tubesheet was calculated at a constant storage pressure of 10,150 psi (70 MPa) for a tubesheet diameter of 9 inches. The storage pressure is lower than the compressive strength of Novolac epoxy. At constant tubesheet diameter, stress in tubesheet decreases with tubesheet thickness. At a tubesheet thickness of 8 inches, bending stress, equivalent transverse tensile stress is estimated to be 2,417 psi and shear stress is estimated to be 2,860 psi, both of which are respectively lower than the transverse tensile and shear strengths of the tubesheet.

In calculating stresses in the tubesheet, certain idealities were assumed. The circular tubesheet was assumed to be flat, of uniform thickness, and of homogeneous isotropic material. The tubesheet thickness was not more than about one-quarter of the least tubesheet diameter. The maximum deflection of tubesheet from the pressure was not more than about one-half the tubesheet thickness. All forces or pressure were perpendicular to the plane of the tubesheet. The tubesheet was nowhere stressed beyond its elastic limit.

The invention provides several advantages.

The inventive container achieves lower operating expenditures. Due to the relatively low density and high tensile strength of glass and the ability of the cured resin to withstand relatively high pressures without experiencing shear at the capillary/tubesheet interface, gases at relatively high pressures may be stored in the inventive container. In comparison to conventional steel or composite cylinders whose entire length must be made of a high strength (and hence heavy) material, much weight may be trimmed from the inventive container by using a relatively low weight protective housing over a significant portion of the capillaries. The cost of transporting compressed gas with the inventive container is lower than that of conventional compressed gas cylinders due to the significantly higher gravimetric and volumetric densities achievable by the inventive container. Bundling single capillaries with an easily formable tubesheet provides a high-density gas storage at a cost similar to composite tanks.

The inventive container is scalable. The volume or mass of gas stored in the container may be increased by using more capillaries, using larger bore capillaries, using longer capillaries, using a higher packing density of capillaries, or using a plurality of the containers connected to one another with a manifold.

The inventive container is not susceptible to boil-off losses because it stores gas, not liquid.

The inventive container does not produce waste unused reactant or byproducts or incur a significant risk of violent reaction from exposure to air or water during production because it uses a mechanical means of storage, not a chemical means.

The inventive container is not susceptible to contamination with oxygen because it is gas-tight.

The inventive container does not require the application or removal of heat each and every time gas is releasing from the container or added to the container.

The inventive container performs in a robust manner and may be constructed in a wide variety of simple designs.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method of manufacturing a compressed gas storage container, the compressed gas storage container comprising a first solid, polymeric tubesheet having a front face, a plurality of aligned glass capillaries extending into the first tubesheet, and a first end cap sealed to the first tubesheet in gas-tight fashion, each of the glass capillaries having an open end that is flush with the front face of the first tubesheet, the first end cap including a gas outlet, said method comprising the steps of:
   aligning a plurality of glass capillaries into a bundle of desired cross-sectional shape, the capillaries being open at a first end of the bundle;
   plugging the open capillary ends with a sealant;
   curing the sealant in the plugged capillary ends;
   dipping the first end of the bundle in a curable, liquid resinous composition;
   removing the dipped bundle end from the composition;
   allowing the composition on the dipped bundle end to cure and form a first unfinished tubesheet;
   machining or milling a portion of the cured, dipped bundle end to form the front face of the first tubesheet, remove the cured sealant and expose open bores of the capillaries;
   sealing ends of the capillaries distal to the dipped bundle; and
   securing the first end cap to the first tubesheet.

2. The method of claim 1, wherein the bundle has a cross-sectional shape that is selected from the group consisting of: circular, hexagonal, trapezoidal, rectangular, triangular, oval, and planar.

3. The method of claim 1, wherein said step of sealing the ends of the capillaries distal to the dipped bundle is performed:
   either before or after said step of aligning; or
   before or after the first tubesheet is formed.

4. The method of claim 3, wherein said step of sealing the ends of the capillaries distal to the dipped bundle is performed after the capillaries are aligned but before the first tubesheet is formed.

5. The method of claim 1, wherein said step of sealing the ends of the capillaries distal to the dipped bundle comprises application of heat to melt and close off the end to be sealed.

6. The method of claim 1, wherein said step of sealing the ends of the capillaries distal to the dipped bundle comprises plugging the ends to be sealed with a high strength material, heating the ends plugged with the high strength material under conditions sufficient to melt the high strength material and form a gas-tight seal, and cooling to solidify the molten plugs.

7. A method of manufacturing a compressed gas storage container, the compressed gas storage container comprising a first solid, polymeric tubesheet having a front face, a second solid, polymeric tubesheet having a front face that is spaced from the first tubesheet, a plurality of aligned glass capillaries extending into the first tubesheet, a first end cap sealed to the first tubesheet in gas-tight fashion, and a second end cap sealed to the second tubesheet in gas-tight fashion, each of the glass capillaries having an open end that is flush with the front face of the first tubesheet and a closed end that is flush with the front face of the second tubesheet, the first end cap including a gas outlet, said method comprising the steps of:

aligning a plurality of glass capillaries into a bundle of desired cross-sectional shape, the capillaries being open at first and second ends of the bundle;

plugging the first open capillary ends with a sealant;

curing the sealant in the plugged capillary ends;

dipping the first end of the bundle in a curable, liquid resinous composition;

removing the dipped, first bundle end from the composition;

allowing the composition on the dipped, first bundle end to cure to form a first unfinished tubesheet;

dipping the second end of the bundle in a curable, liquid resinous composition;

removing the dipped, second bundle end from the composition;

allowing the composition on the dipped, second bundle end to cure to form a second unfinished tubesheet;

machining or milling a portion of the cured, dipped first bundle end to form the front of the first tubesheet, remove the sealant, and expose open bores of the capillaries at the first bundle end;

machining or milling a portion of the cured, dipped second bundle end to form the front face of the second tubesheet without exposing open bores of the capillaries at the second bundle end; and securing the first and second end caps to the first and second tubesheets, respectively.

* * * * *